United States Patent
Nakano et al.

(10) Patent No.: US 11,027,544 B2
(45) Date of Patent: Jun. 8, 2021

(54) INK JET METHOD AND INK JET APPARATUS

(71) Applicant: Seiko Epson Corporation, Tokyo (JP)

(72) Inventors: Keitaro Nakano, Matsumoto (JP); Kyohei Tanaka, Matsumoto (JP); Midori Sekine, Matsumoto (JP); Chigusa Sato, Shiojiri (JP)

(73) Assignee: Seiko Epson Corporation

( * ) Notice: Subject to any disclaimer, the term of this patent is extended or adjusted under 35 U.S.C. 154(b) by 0 days.

(21) Appl. No.: 16/784,600

(22) Filed: Feb. 7, 2020

(65) Prior Publication Data

US 2020/0254755 A1  Aug. 13, 2020

(30) Foreign Application Priority Data

Feb. 8, 2019  (JP) .............................. JP2019-021456

(51) Int. Cl.

| B41J 2/13 | (2006.01) |
|---|---|
| B41J 2/135 | (2006.01) |
| C09D 11/30 | (2014.01) |
| B41J 2/435 | (2006.01) |

(52) U.S. Cl.
CPC .............. *B41J 2/135* (2013.01); *B41J 2/435* (2013.01); *C09D 11/30* (2013.01)

(58) Field of Classification Search
None
See application file for complete search history.

(56) References Cited

U.S. PATENT DOCUMENTS

| 7,338,154 B2* | 3/2008 | Hasebe | B41J 3/543 347/101 |
|---|---|---|---|
| 2010/0196602 A1* | 8/2010 | Koyano | B41J 2/14314 427/256 |
| 2017/0233594 A1* | 8/2017 | Yoda | B41M 5/0023 347/102 |

FOREIGN PATENT DOCUMENTS

| CN | 102925001 A | 2/2013 |
|---|---|---|
| JP | 2012-219203 A | 11/2012 |

* cited by examiner

*Primary Examiner* — Erica S Lin
(74) *Attorney, Agent, or Firm* — Harness, Dickey & Pierce, P.L.C.

(57) ABSTRACT

An ink jet method includes: a discharging step of discharging a radiation-curable ink jet composition onto a recording medium at an ink weight per dot of 22 ng/dot or less by using an ink jet head configured to discharge the radiation-curable ink jet composition and having a nozzle density of 600 npi or more; and an irradiating step of irradiating, with radiation, the radiation-curable ink jet composition attached to the recording medium. The radiation-curable ink jet composition contains polymerizable compounds including a monofunctional monomer and a multifunctional monomer. The monofunctional monomer includes a nitrogen-containing monofunctional monomer. The amount of the monofunctional monomer is 90 mass % or more relative to the total amount of the polymerizable compounds. The amount of the nitrogen-containing monofunctional monomer is from 1 to 15 mass % relative to the total amount of the polymerizable compounds.

22 Claims, 1 Drawing Sheet

INK JET METHOD AND INK JET APPARATUS

The present application is based on, and claims priority from JP Application Serial Number 2019-021456, filed Feb. 8, 2019, the disclosure of which is hereby incorporated by reference herein in its entirety.

BACKGROUND

1. Technical Field

The present disclosure relates to an ink jet method and an ink jet apparatus.

2. Related Art

Ink jet recording methods enable recording of high-definition images with relatively simple apparatuses and are rapidly developing in various fields. During development, various studies have been made to suppress aging and yellowing of cured films. For example, JP-A-2012-219203 discloses an active energy ray-curable ink jet white ink composition containing a titanium oxide pigment, which is a white pigment, and a polymerizable compound. In the ink jet white ink composition, 50 mass % or more of the titanium oxide pigment is rutile titanium dioxide. The ink jet white ink composition further contains a hindered amine compound having a piperidine structure.

However, the use of a head including multiple nozzle columns arranged at different positions in the scanning direction and in the direction intersecting the scanning direction causes the following problems: the glossiness of a cured product differs depending on location on the surface; and a cured product has poor surface smoothness.

SUMMARY

According to an aspect of the present disclosure, an ink jet method includes: a discharging step of discharging a radiation-curable ink jet composition from an ink jet head; and an irradiating step of irradiating the discharged radiation-curable ink jet composition with radiation. The ink jet head includes: a first nozzle group including multiple nozzles in a column direction; and a second nozzle group including multiple nozzles in the column direction. The first nozzle group and the second nozzle group are arranged at different positions from each other in the column direction and in a scanning direction intersecting the column direction. In the discharging step, a scan that involves discharging the radiation-curable ink jet composition from the first nozzle group and the second nozzle group while the ink jet head is scanned in the scanning direction is performed. In the irradiating step, the radiation is emitted from a radiation source disposed at a side of the ink jet head opposite to the scanning direction. The radiation-curable ink jet composition contains a monofunctional monomer including a nitrogen-containing monofunctional monomer. The amount of the nitrogen-containing monofunctional monomer is from 5 to 40 mass % relative to the total amount of the radiation-curable ink jet composition.

In the ink jet method, the discharging step may involve discharging the radiation-curable ink jet composition from the ink jet head while a carriage carrying the ink jet head and the radiation source disposed at a side of the ink jet head opposite to the scanning direction is scanned in the scanning direction. The irradiating step may involve irradiating the radiation-curable ink jet composition discharged in the scanning with radiation from the radiation source in the same scanning as in the discharging step. The scanning may be performed multiple times.

In the ink jet method, the nitrogen-containing monofunctional monomer may include either a monofunctional monomer having a nitrogen-containing heterocyclic ring or a monofunctional monomer having a cyclic amide structure.

In the ink jet method, the nitrogen-containing monofunctional monomer may include acryloylmorpholine.

In the ink jet method, the amount of the monofunctional monomer may be 70 mass % or more relative to the total amount of the radiation-curable ink jet composition.

In the ink jet method, the radiation-curable ink jet composition may contain a bi- or higher-functional polymerizable compound, and the amount of the bi- or higher-functional polymerizable compound may be 20 mass % or less relative to the total amount of the radiation-curable ink jet composition.

In the ink jet method, the amount of the nitrogen-containing monofunctional monomer may be from 7 to 20 mass % relative to the total amount of the radiation-curable ink jet composition.

In the ink jet method, the radiation energy in one time of irradiation during the irradiation may be from 50 to 300 $J/cm^2$.

In the ink jet method, the radiation may be ultraviolet radiation having an emission peak wavelength of from 360 to 420 nm.

In the ink jet method, the distance in the scanning direction between the first nozzle group and the second nozzle group may be from 10 to 30 mm.

In the ink jet method, main curing may be performed by one time of irradiation during the irradiation.

In the ink jet method, the radiation-curable ink jet composition may contain, as the monofunctional monomer, either a monofunctional monomer having an aromatic ring or a monofunctional monomer having an alicyclic ring.

In the ink jet method, the ink weight per dot discharged in the discharging step may be 20 ng/dot or less.

In the ink jet method, the first nozzle group and the second nozzle group may each have a nozzle density of from 150 to 600 npi in the column direction.

In the ink jet method, the first nozzle group and the second nozzle group may each have a length of from 1 to 5 inches in the column direction.

The ink jet method may be a recording method for recording on a recording medium, where the discharging step involves attaching the discharged radiation-curable ink jet composition to the recording medium, and the irradiating step involves irradiating, with the radiation, the radiation-curable ink jet composition attached to the recording medium.

According to an aspect of the present disclosure, an ink jet apparatus includes: an ink jet head that discharges a radiation-curable ink jet composition; and a radiation source that emits radiation to the discharged radiation-curable ink jet composition. The ink jet head includes: a first nozzle group including multiple nozzles in a column direction; and a second nozzle group including multiple nozzles in the column direction. The first nozzle group and the second nozzle group are arranged at different positions from each other in the column direction and in a scanning direction intersecting the column direction. The radiation source is disposed at a side of the ink jet head opposite to the scanning direction when the ink jet head is scanned in the scanning direction. The discharged radiation-curable ink jet composition contains a monofunctional monomer including a nitrogen-containing monofunctional monomer. The amount of the nitrogen-containing monofunctional monomer is from 5 to 40 mass % relative to the total amount of the radiation-curable ink jet composition.

Moreover, the ink jet head according to the present disclosure is an ink jet head used to discharge the radiation-curable ink jet composition. The ink jet head according to the present disclosure includes: a first nozzle group including multiple nozzles in a column direction; and a second nozzle group including multiple nozzles in the column direction. The first nozzle group and the second nozzle group are arranged at different positions from each other in the column direction and in a scanning direction intersecting the column direction. The radiation-curable ink jet composition to be discharged contains a monofunctional monomer including a nitrogen-containing monofunctional monomer. The amount of the nitrogen-containing monofunctional monomer is from 5 to 40 mass % relative to the total amount of the radiation-curable ink jet composition.

According to an aspect of the present disclosure, a set includes a radiation-curable ink jet composition and an ink jet head. The ink jet head is used to discharge the radiation-curable ink jet composition. The ink jet head includes: a first nozzle group including multiple nozzles in a column direction; and a second nozzle group including multiple nozzles in the column direction. The first nozzle group and the second nozzle group are arranged at different positions from each other in the column direction and in a scanning direction intersecting the column direction. The radiation-curable ink jet composition contains a monofunctional monomer including a nitrogen-containing monofunctional monomer. The amount of the nitrogen-containing monofunctional monomer is from 5 to 40 mass % relative to the total amount of the radiation-curable ink jet composition.

DESCRIPTION OF EXEMPLARY EMBODIMENTS

Figure 1:
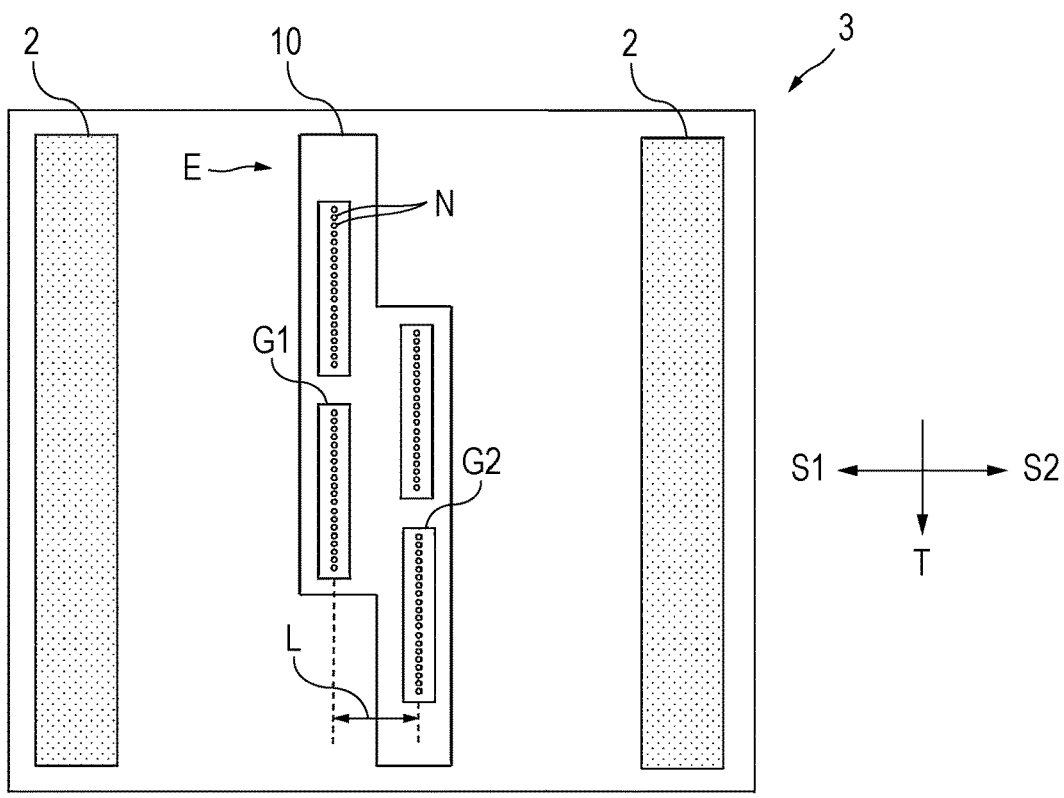
FIG. 1 is a plan view of an ejection surface of an ink jet head that may be used in an embodiment.

Embodiments of the present disclosure (hereinafter referred to as "embodiments") will be described below in detail with reference to the drawings as necessary. However, the present disclosure is not limited to these embodiments, and various modifications can be made without departing from the spirit or scope of the present disclosure. The same elements are denoted by the same reference characters in the drawings, and overlapping description is omitted. Unless otherwise specified, positional relationships, such as vertical and horizontal relationships, are based on the positional relationships shown in the drawings. Furthermore, the dimensional ratios in the drawings are not limited to those shown in the drawings.

As used herein, the term "(meth)acryloyl" refers to at least one of an acryloyl and the corresponding methacryloyl, the term "(meth)acrylate" refers to at least one of an acrylate and the corresponding methacrylate, and the term "(meth)acrylic" refers to at least one of acrylic and the corresponding methacrylic. Note that, the term "acryloyl" refers to at least one of an acryloyl and the corresponding methacryloyl, the term "acrylate" refers to at least one of an acrylate and the corresponding methacrylate, and the term "acrylic" refers to at least one of acrylic and the corresponding methacrylic.

1. Ink Jet Method

An ink jet method according to an embodiment includes: a discharging step of discharging a radiation-curable ink jet composition (hereinafter also referred to simply as a "composition") having a predetermined composition from nozzle columns of an ink jet head while scanning the ink jet head in the scanning direction; and an irradiating step of irradiating the discharged composition with radiation from a radiation source disposed downstream of the ink jet head in the scanning direction.

The composition according to this embodiment is used to be discharged from the ink jet head by the ink jet method. A radiation-curable ink composition will be described below as an embodiment of the radiation-curable ink jet composition. However, the composition according to this embodiment may be a composition other than an ink composition and may be, for example, a composition used for 3D molding. The ink jet method uses discharge of the composition from the ink jet head. Examples of the ink jet method include a recording method for recording and a molding method for molding. The composition used in the ink jet method is referred to as an ink jet composition. A radiation-curable composition is cured by irradiating the composition with radiation before use.

In a recording method using a radiation-curable ink composition, the composition discharged from the ink jet head is attached to a recording medium in a discharging step, and the composition attached to the recording medium is irradiated with radiation in an irradiating step.

In this embodiment, an ink jet head including a first nozzle group and a second nozzle group is used. The first nozzle group includes multiple nozzles in the column direction, and the second nozzle group includes multiple nozzles in the column direction. The first nozzle group and the second nozzle group are arranged at different positions from each other in the column direction and in a scanning direction intersecting the column direction.

FIG. 1 is a plan view of an ejection surface of an example ink jet head that may be used in this embodiment. The ink jet head is manufactured, for example, by producing head chip units C and arranging the head chip units C in the column direction such that the head chip units are arranged at different positions in the scanning direction. The reason for arranging the head chip units is as follows: for example, like a nozzle group G1 and a nozzle group G2 shown in FIG. 1, the use of two nozzle groups arranged at different positions from each other in the column direction enables a wider range of recording in the column direction. One nozzle group may partially overlap the other nozzle group in the column direction. For example, one of two nozzle groups preferably does not overlap the other nozzle group by a length equal to or more than half the length of the one nozzle group in the column direction.

The nozzle groups may be, for example, disposed in a staggered arrangement to form a longer head. A head of a serial printer is not necessarily as long as a line head, but may be a long head including two or more head chips in order to increase the recording speed. The number of head chips in the line head may be further increased. In the example shown in FIG. 1, more head chips can be staggered to form a line head when head chips are connected to each other at upper and lower protrusion portions E.

The ink jet head is not limited to a head including two or more head chip units arranged in advance and may be a head produced by arranging heads in the direction T and at different positions in the scanning direction during printer manufacture. In other words, the "nozzle group" in this embodiment may be a head chip unit or may be one head when one head chip constitutes one head.

A recorded article is produced by discharging the radiation-curable ink composition by using a head having such arrangement in this embodiment. As a result, the image recorded by performing scanning in the scanning directions S1 and S2 has portions having different glossiness of the surface. When light is reflected off the obtained image, the portions having different glossiness become more obvious. The portions having different glossiness in the image will be described. Strip-shaped portions extending in the scanning direction in the image are referred to as bands. It is confirmed that the glossiness differs between bands. As seen in the direction T, the glossiness differs depending on position in the direction T. The strip-shaped portions are linear strips having a narrow width in the direction T. Depending on position in the direction T, glossiness may differ between lines extending in the scanning direction. The portions having different glossiness are obtained in these cases. In this embodiment, such differences in glossiness are also collectively referred to as gloss banding.

The head chip has a contour of a head chip containing nozzle groups. It is necessary to arrange head chips such that the head chips are displaced from each other in the directions S1 and S2 in order to avoid overlap of the contours of the head chips at a joint between the head chips in the column direction (direction T) when nozzles are arranged at regular intervals in the column direction without interruption. For this, a staggered-arrangement ink jet head includes nozzle groups G1 and G2 staggered in the scanning directions S1 and S2, as described above. With this arrangement, a distance L is generated between the nozzle group G1 and the nozzle group G2, and the time from discharge of the composition to irradiation with radiation differs between the nozzle groups. This may cause differences in ink spreading from ink landing to irradiation, may generate portions having different surface smoothness after irradiation, and may generate differences in image gloss between head chips. In particular, since one composition is discharged from multiple head chips C, gloss banding tends to be generated in areas subjected to recording with the same color.

The foregoing problem has been examined, and it is found that the use of a nitrogen-containing monofunctional monomer in the radiation-curable ink composition can reduce gloss banding. This may be because a nitrogen-containing monofunctional monomer is less susceptible to oxygen inhibition and has high curability. A nitrogen-containing monofunctional monomer has high curability and tends to be cured in a convex shape before the composition spreads on a recording medium. This may reduce gloss of the entire image and may make differences in gloss unnoticeable. However, the use of a nitrogen-containing monofunctional monomer degrades image surface smoothness instead and reduces glossiness of the entire image. In addition, touching image surface gives unevenness and discomfort, or the composition is cured before droplets of the composition spread on a recording medium. As a result, the composition cannot sufficiently cover the surface of a recording medium, and the base of the recording medium is exposed. However, it is found that the use of a nitrogen-containing monofunctional monomer in a predetermined amount maintains surface smoothness and reduces gloss banding. Each step will be described below in detail.

1.1. Discharging Step

The discharging step involves discharging a predetermined composition from a staggered-arrangement ink jet head. More specifically, the composition placed in a pressure-generating chamber of the ink jet head is discharged from nozzles by driving a pressure-generating unit. Such a discharging method is also referred to as an ink jet method.

Examples of the ink jet head used in the discharging step include a line head for recording with a line system, and a serial head for recording with a serial system.

In the line system using a line head, for example, an ink jet head having a width equal to or more than the recoding width of a recording medium is fixed to an ink jet apparatus. The recording medium is then moved in the transport direction (the longitudinal direction of the recording medium), and ink droplets are discharged from the nozzles of the ink jet head in conjunction with this movement. An image is recorded on the recording medium accordingly. This is line scanning. The scanning direction in the line system is opposite to the transport direction. In the line system, a radiation source is disposed at a side (transport direction side) of the ink jet head opposite to the scanning direction.

In the serial system using a serial head, for example, an ink jet head is carried by a carriage movable in the width direction of a recording medium. Scanning is then performed as follows: the carriage is moved in the main-scanning direction (the transverse direction or width direction of the recording medium), and ink droplets are discharged from nozzle orifices of the head in conjunction with this movement. Scanning and sub-scanning that transports the recording medium in the transport direction intersecting the main-scanning direction are alternately performed multiple times. An image can be recorded on the recording medium accordingly.

In particular, in this embodiment, the radiation-curable ink jet composition is preferably discharged from the ink jet head while a carriage carrying the ink jet head and a radiation source disposed downstream of the ink jet head in the main-scanning direction is scanned in the direction toward the upstream side of the scanning direction.

A staggered-arrangement ink jet head will be described below again. FIG. 1 is a plan view of a surface of an ink jet head used in the serial system, where the surface faces a recording medium. As shown in FIG. 1, multiple nozzles N are formed in the surface facing the recording medium. In FIG. 1, an ink jet head 10 and a radiation source 2 are carried by a carriage 3.

The nozzles N are classified into a first nozzle group G1 and a second nozzle group G2. The first nozzle group G1 and the second nozzle group G2 are arranged in a staggered manner. Each of the first nozzle group G1 and the second nozzle group G2 is a group of nozzles N arranged in the direction T, and the first nozzle group G1 and the second nozzle group G2 are arranged at a distance L in the scanning directions S1 and S2. The arrangement of the first nozzle group G1 and the second nozzle group G2 at different positions from each other in the directions S1 and S2 and in the direction T is referred to as staggered arrangement.

The distance L between the first nozzle group G1 and the second nozzle group G2 in the scanning directions S1 and S2 is preferably from 5 to 50 mm, more preferably from 10 to 30 mm, and still more preferably from 15 to 25 mm. At a distance L of 5 mm or more, it easy to generate gloss banding, and the present disclosure is particularly effective. It is also easy to arrange nozzle groups. At a distance L of 50 mm or less, it is possible to arrange nozzle groups with high density. Such a distance is preferred in order to downsize the entire ink jet apparatus.

When the number of nozzle groups is 3 or more, the positions of nozzle groups in the scanning direction may be not only 2 as shown in FIG. 1 but also 3 or more. The arrangement of nozzle groups may be not only the zigzag arrangement shown in FIG. 1 but also a complicated arrangement. The distance L is a distance between the leftmost nozzle group and the rightmost nozzle group in the scanning direction among nozzle groups.

The nozzle density of each of the first nozzle group G1 and the second nozzle group G2 in the column direction T is preferably from 100 to 1500 npi, more preferably from 100 to 800 npi, still more preferably from 150 to 600 npi, yet still more preferably from 200 to 500 npi, and yet still more preferably from 200 to 400 npi. The nozzle density is yet still more preferably from 250 to 350 npi. At a nozzle density in the above range, the obtained recorded article has higher dot density and thus has high definition.

The length of each of the first nozzle group G1 and the second nozzle group G2 in the column direction T is preferably from 1 to 5 inches, more preferably from 1 to 4 inches, and still more preferably from 1 to 3 inches. The length in the column direction T in the above range is preferred in order to further improve print speed and reduce costs for manufacturing ink jet heads.

Although the number of nozzle groups is 4 in the example shown in FIG. 1, the number of nozzle groups is 2 or more, preferably from 2 to 20, more preferably from 3 to 15, and still more preferably from 4 to 8. Such a number of nozzle groups in this case is preferred in order to improve the recording speed and downsize the apparatus. Any one of nozzle groups and one of the other nozzle groups are arranged at different positions from each other in the scanning direction. Any one of nozzle groups and one of the other nozzle groups are arranged at different positions from each other in the column direction. The number of nozzle groups in the above range is preferred in order to reduce gloss difference.

The disposition of the radiation source 2 at a side of the ink jet head 10 opposite to the scanning direction (downstream of the ink jet head 10 in the scanning direction) as shown in FIG. 1 enables discharge of the composition from the nozzles N and irradiation of the discharged composition with radiation during scanning when scanning is performed. This feature enables high-speed printing. In general, immediate irradiation of the discharged composition with radiation in this way may cause curing to proceed before the composition spreads in a wetting manner and may generate, in a recording medium, unevenness attributed to the composition to impair color development. However, in this embodiment, the susceptibility to oxygen inhibition is appropriately increased by controlling the amount of nitrogen-containing monofunctional monomer. This can provide a recorded article having good color development even by such high-speed printing. In the serial system, scanning is also referred to as main scanning.

As shown in FIG. 1, the carriage scanning direction corresponds to the direction S1 or S2. In bidirectional printing, scanning in the direction S1 alternates with scanning in the direction S2. In unidirectional printing, either scanning in the direction S1 or scanning in the direction S2 is performed. The "side opposite to the scanning direction" refers to the direction S2 for scanning in the direction S1 and refers to the direction S1 for scanning in the direction S2.

Bidirectional printing preferably uses a radiation source disposed at each side of the ink jet head in the direction S1 and the direction S2. This configuration enables, in both scanning in the direction S1 and scanning in the direction S2, discharge of the composition from the nozzles N and irradiation of the discharged composition with radiation during the same scanning.

Bidirectional printing may involve, in either scanning in the direction S1 or scanning in the direction S2, discharge of the composition from the nozzles N and irradiation of the discharged composition with radiation during the same scanning. In this case, a radiation source is disposed at a side of the ink jet head in one of the direction S1 and the direction S2.

In unidirectional printing, a radiation source is disposed at a side of the ink jet head in one of the direction S1 and the direction S2. The side opposite to the scanning direction is also referred to as the downstream side in the scanning direction.

When a radiation source is disposed at each side of the ink jet head in the direction S1 and the direction S2, a difference in distance in the scanning direction between each radiation source and a central position of the distance L of the ink jet head in the scanning direction is not limited but is preferably small in order to improve the balance of the weight of the entire carriage. In terms of this point, a difference in the distance is preferably within 30% of the distance between the radiation sources in the scanning direction.

For example, in FIG. 1, the carriage 3 may further carry an ink jet head other than the ink jet head 10 at the left side or right side of the ink jet head 10 in the drawing in the scanning direction. In this case, a difference in distance is a difference in distance in the scanning direction between each radiation source and a central position between a central position of the leftmost ink jet head in the scanning direction and a central position of the rightmost ink jet head in the scanning direction.

The ink weight (mass) per dot, namely, ink droplet weight, is preferably 20 ng/dot or less, more preferably 17 ng/dot or less, still more preferably 15 ng/dot or less, yet still more preferably 10 ng/dot or less, and yet still more preferably 8 ng/dot or less. The lower limit of the ink weight per dot is not limited and may be, for example, 3 ng/dot or more. When the ink weight per dot is 20 ng/dot or less, the dots have a large specific surface area and are susceptible to oxygen inhibition. However, the use of the radiation-curable ink jet composition according to this embodiment tends to suppress a decrease in curability. The ink weight per dot can be adjusted by, for example, controlling the nozzle diameter of the ink jet head, the volume of a pressure-generating chamber, and a pressure-generating unit that generates a driving force for discharging ink droplets.

The ink jet method preferably includes at least ink discharge at an ink weight per dot in the above range. In addition to this discharge, the ink jet method may further include ink discharge at an ink weight per dot out of the above range.

In the discharging step, the composition may be discharged with heating. The heating temperature for the composition is preferably from 40° C. to 60° C., and more preferably from 40° C. to 50° C.

The ink jet head used in the serial system has been described with reference to FIG. 1. The same configuration can also apply to the line system except that an ink jet head having a width equal to or more than the recoding width of a recording medium is fixed to an ink jet apparatus, and scanning for discharging ink droplets from the nozzles of the ink jet head is performed in conjunction with the movement of the recording medium in the scanning direction (the longitudinal direction or transport direction of the recording medium). The line system also includes discharge of the composition from the nozzles and irradiation of the discharged composition with radiation during scanning. The scanning is performed one time in recording.

1.2. Irradiating Step

The irradiating step involves irradiating, with radiation, the radiation-curable ink jet composition discharged from the ink jet head. In particular, the radiation-curable ink jet composition discharged and attached to an attachment target is irradiated with radiation. In a recording method, the radiation-curable ink jet composition attached to a recording medium is irradiated with radiation. Upon irradiation with radiation, the monomer polymerization reaction starts, and the composition is cured to form a coating film. When a polymerization initiator is present at this time, the polymerization initiator generates an active species (initiation species), such as radical, acid, or base, and the monomer polymerization reaction is promoted by the function of the initiation species. When a photosensitizer is present, the photosensitizer absorbs radiation into an excited state, and the excited photosensitizer comes into contact with the polymerization initiator to promote the decomposition of the polymerization initiator, thus further achieving the curing reaction.

Examples of the radiation include ultraviolet radiation, infrared radiation, visible light, and X-rays. The composition is irradiated with radiation by using a radiation source disposed downstream of the ink jet head. The radiation is preferably ultraviolet radiation. This is because ultraviolet-curable materials are easily available, and ultraviolet radiation have high curing performance. In particular, the radiation is preferably ultraviolet radiation having an emission peak wavelength of from 360 to 420 nm. Such ultraviolet radiation tends to have higher curing performance.

Examples of the radiation source include, but are not limited to, ultraviolet light-emitting diodes. The use of such a radiation source can downsize the apparatus and reduce costs. An ultraviolet light-emitting diode serving as an ultraviolet source is compact and thus can be installed into the ink jet apparatus. For example, an ultraviolet light-emitting diode can be installed into the carriage (both ends in the medium width direction, and/or medium transport direction side) carrying the ink jet head which discharges the radiation-curable ink jet composition.

In particular, the irradiating step preferably includes scanning for discharging the composition by using a carriage carrying an ink jet head and a radiation source disposed downstream of the ink jet head in the main-scanning direction and irradiation of the composition discharged in the scanning with radiation from a radiation source in the same scanning. As described above, this feature achieves high-speed printing and enables the obtained recorded article to have high definition and high color development in this embodiment.

In particular, the serial system preferably uses a recording method of scanning an ink jet head over a given location on a recording medium multiple times. This is, for example, the case where the distance of one sub-scanning is shorter than the distance of the ink jet head in the direction T. For example, when the distance of one sub-scanning is a quarter of the distance of the ink jet head in the direction T, an ink jet head is scanned over a given location on a recording medium 4 times. In this case, the composition can be attached to a given location on the recording medium through 4 times of scanning. The number of times of scanning (the number of scans) is preferably but not necessarily 2 or more, more preferably from 2 to 20, still more preferably from 3 to 16, and yet still more preferably from 4 to 10.

In the serial system, onto the composition attached and cured in the previous scanning, the composition is attached in the following scanning. The spreading manner of composition dots on the cured composition may differ from the spreading manner of composition dots on a recording medium. In addition to this, the time from attachment to irradiation with radiation differs between nozzle groups. The combination of these differences may make a difference in dot spreading manner more obvious and generate portions having different glossiness.

In bidirectional printing, the distance between the head and a right-side light source may differ from the distance between the head and a left-side light source. In this case, the time from ink landing to irradiation in scanning to the right differs from that in scanning to the left. This may contribute to a difference in glossiness. For such a reason, in particular, a difference in glossiness tends to be generated. Therefore, the present disclosure is particularly effective for an ink jet method using the serial system. In an ink jet method using the line system, the dots of the cured composition have different diameters depending on the time from attachment to irradiation. This may degrade image quality.

The radiation energy onto the composition in one time of irradiation is preferably from 50 to 1000 $J/cm^2$, more preferably from 50 to 500 $J/cm^2$, still more preferably from 100 to 300 $J/cm^2$, and yet still more preferably from 150 to 300 $J/cm^2$. One time of irradiation is irradiation in one scan. At a radiation energy in one time of irradiation in the above range, the composition tends to have higher curability. At a radiation energy during one irradiation in the above range, high curability and high surface smoothness tend to be obtained when the amount of the nitrogen-containing monofunctional monomer is controlled at 5 to 40 mass % relative to the total amount of the composition. The irradiance of radiation directed to the composition is preferably but not necessarily from 1 to 12 $W/cm^2$, more preferably from 3 to 8 $W/cm^2$, and still preferably from 4 to 7 $W/cm^2$.

In the irradiating step, main curing is preferably performed by one time of irradiation. As used therein, the term "main curing" refers to curing of dots formed on a recording medium into a cured state needed for using a recorded article. This main curing process tends to further improve print speed. Main curing may be performed by two or more times of irradiation. The curing before reaching main curing is referred to as pre-curing. The total radiation energy in one or two or more times of performed irradiation is not limited but may be in the above radiation energy range.

2. Radiation-Curable Ink Jet Composition

Next, the radiation-curable ink jet composition used in the ink jet method according to this embodiment will be described. The radiation-curable ink jet composition used in this embodiment contains a monofunctional monomer including a nitrogen-containing monofunctional monomer. The amount of the nitrogen-containing monofunctional monomer is from 5 to 40 mass % relative to the total amount of the composition.

The radiation-curable ink jet composition according to this embodiment is cured by irradiation with radiation. Examples of the radiation include ultraviolet radiation, infrared radiation, visible light, and X-rays. The radiation is preferably ultraviolet radiation because a radiation source is easily available and widely used, and materials suitable for curing by irradiation with ultraviolet radiation are easily available and widely used.

Possible components, physical properties, and a manufacture method for the radiation-curable ink jet composition according to this embodiment will be described below.

2.1. Polymerizable Compound

The radiation-curable ink jet composition contains a monofunctional monomer having one polymerizable functional group and, as necessary, may further contain a multifunctional monomer having multiple polymerizable functional groups or an oligomer having one or more polymerizable functional groups. Monofunctional monomers, multifunctional monomers, and oligomers are collectively referred to as polymerizable compounds. Polymerizable compounds may be used alone or in combination of two or more. In this embodiment, polymerizable compounds having a molecular weight of 1000 or more are defined as oligomers, and polymerizable compounds having a molecular weight of less than 1000 are defined as monomers. Examples of polymerizable functional groups include (meth)acryloyl groups, vinyl groups, and vinyl ether groups. These groups are preferred in terms of high curability. When a polymerizable compound has multiple polymerizable functional groups, the polymerizable compound may have the same polymerizable functional groups or may have different polymerizable functional groups. A monomer having a (meth)acryloyl group is also referred to as an acrylate monomer. A monomer having a vinyl group is also referred to as a vinyl monomer, and a monomer having a vinyl ether group is also referred to as a vinyl ether monomer.

2.1.1. Monofunctional Monomer

The monofunctional monomer according to this embodiment may include a nitrogen-containing monofunctional monomer and, as necessary, may further include an alicyclic group-containing monofunctional monomer, an aromatic group-containing monofunctional monomer, a cyclic ether group-containing monofunctional monomer, or other monomers. As necessary, the monofunctional monomer according to this embodiment may further include other monofunctional monomers. Examples of other monofunctional monomers that can be used include, but are not limited to, known monofunctional monomers having polymerizable functional groups, particularly, polymerizable functional groups having an unsaturated carbon-carbon double bond.

The amount of the monofunctional monomer is preferably 50 mass % or more and more preferably 60 mass % or more relative to the total amount of the composition. Furthermore, the amount of the monofunctional monomer is preferably 70 mass % or more, more preferably 75 mass % or more, and still more preferably 80 mass % or more. When the amount of the monofunctional monomer is in the above range relative to the total amount of the composition, adhesion tends to be further improved. In addition, gloss difference is reduced, and surface smoothness is further improved. The upper limit of the amount of the monofunctional monomer is preferably 95 mass % or less, more preferably 92 mass % or less, still more preferably 90 mass % or less, and yet still more preferably 88 mass % or less relative to the total amount of the composition. When the amount of the monofunctional monomer is below or in the above range relative to the total amount of the composition, the rub fastness tends to be further improved. Many monofunctional monomers have a relatively low molecular weight. When the composition contains a large amount of the monofunctional monomer, there is a large number of polymerizable functional groups per mass of the composition. This may provide the above advantageous effects.

Examples of the monofunctional monomer are illustrated below, but the monofunctional monomer in this embodiment is not limited to the following monomers. 2.1.1.1. Nitrogen-Containing Monofunctional Monomer Examples of the nitrogen-containing monofunctional monomer include, but are not limited to, nitrogen-containing monofunctional vinyl monomers, such as N-vinylcaprolactam, N-vinylformamide, N-vinylcarbazole, N-vinylacetamide, and N-vinylpyrrolidone; nitrogen-containing monofunctional acrylate monomers, such as acryloylmorpholine; and nitrogen-containing monofunctional acrylamide monomers, such as (meth)acrylamides, such as N-hydroxymethyl (meth)acrylamide, diacetone acrylamide, N,N-dimethyl (meth)acrylamide, and dimethylaminoethyl acrylate benzyl chloride quaternary salt.

The nitrogen-containing monofunctional monomer is preferably a monofunctional monomer having a cyclic amide structure or a monofunctional monomer having a nitrogen-containing heterocyclic ring in terms of high curability. The nitrogen-containing heterocyclic ring is a heterocyclic ring having a nitrogen atom as an atom of the heterocyclic ring. The nitrogen-containing monofunctional monomer preferably includes either a nitrogen-containing monofunctional vinyl monomer or a nitrogen-containing monofunctional acrylate monomer. In particular, N-vinylcaprolactam, N-vinylcarbazole, N-vinylpyrrolidone, acryloylmorpholine, or the like are preferred. The nitrogen-containing monofunctional monomer more preferably includes either a monofunctional monomer having a cyclic amide structure, such as N-vinylcaprolactam or N-vinylpyrrolidone, or a monofunctional monomer having a nitrogen-containing heterocyclic ring, such as N-vinylcarbazole or acryloylmorpholine. The use of such a nitrogen-containing monofunctional monomer tends to reduce gloss banding and further improve coating film rub fastness. Moreover, a monofunctional monomer having a cyclic amide structure, such as N-vinylcaprolactam, further improves coating film adhesion and has a great effect on reduction in gloss difference. A monofunctional monomer having a nitrogen-containing heterocyclic ring having a nitrogen-containing heterocyclic structure, such as acryloylmorpholine, tends to further reduce the odor of the composition and has a great effect on surface smoothness and discharge stability. The combinational use of a monofunctional monomer having a cyclic amide structure and a monofunctional monomer having a nitrogen-containing heterocyclic ring is also preferred in terms of the foregoing points.

The amount of the nitrogen-containing monofunctional monomer is preferably from 5 to 40 mass %, more preferably from 5 to 30 mass %, and still more preferably from 7 to 20 mass %, relative to the total amount of the composition. The amount of the nitrogen-containing monofunctional monomer is yet still more preferably from 8 to 15 mass %, yet still more preferably from 10 to 14 mass %, and yet still more preferably from 10 to 13 mass %. When the amount of the nitrogen-containing monofunctional monomer is in the above range, gloss banding is reduced. In addition, the coating film rub fastness, curability, and adhesion are further improved. Moreover, the nitrogen-containing monofunctional monomer has high curability and, when exposed to light leaking from a radiation source, tends to generate foreign substances at nozzles to cause discharge defects. However, when the amount of the nitrogen-containing monofunctional monomer is in the above range, such discharge defects are unlikely to occur.

When the radiation-curable composition contains a monofunctional monomer other than nitrogen-containing monofunctional monomers, the amount of the monofunctional monomer is preferably from 30 to 85 mass %, more preferably from 40 to 80 mass %, and still more preferably from 70 to 75 mass %, relative to the total mass of the composition. The amount of the monofunctional monomer other than nitrogen-containing monofunctional monomers may be the same as preferred amounts of various monofunctional monomers described below.

2.1.1.2. Alicyclic Group-Containing Monofunctional Monomer

Examples of the alicyclic group-containing monofunctional monomer include, but are not limited to, monomers having a monocyclic hydrocarbon group, such as tert-butyl-cyclohexanol acrylate (TBCHA) and 2-(meth)acrylic acid-1,4-dioxaspiro[4,5]dec-2-yl methyl; monomers having an unsaturated polycyclic hydrocarbon group, such as dicyclopentenyl acrylate and dicyclopentenyl oxyethyl acrylate; and monomers having a saturated polycyclic hydrocarbon group, such as dicyclopentanyl acrylate and isobornyl acrylate. Among these, a monomer having an unsaturated polycyclic hydrocarbon group is preferably contained, and at least dicyclopentenyl acrylate is more preferably contained. The use of such an alicyclic group-containing monofunctional monomer tends to further improve coating film rub fastness.

The amount of the alicyclic group-containing monofunctional monomer is preferably from 15 to 45 mass %, more preferably from 20 to 40 mass %, and still more preferably from 25 to 35 mass %, relative to the total amount of the composition. When the amount of the alicyclic group-containing monofunctional monomer is in the above range, the coating film rub fastness tends to be further improved.

2.1.1.3. Aromatic Group-Containing Monofunctional Monomer

Examples of the aromatic group-containing monofunctional monomer include, but are not limited to, phenoxyethyl (meth)acrylate, benzyl (meth)acrylate, alkoxylated 2-phenoxyethyl (meth)acrylate, ethoxylated nonylphenyl (meth) acrylate, alkoxylated nonylphenyl (meth) acrylate, p-cumylphenol EO-modified (meth) acrylate, and 2-hydroxy-3-phenoxypropyl (meth)acrylate. Among these monomers, phenoxyethyl (meth)acrylate and benzyl (meth)acrylate are preferred, phenoxyethyl (meth)acrylate is more preferred, and phenoxyethyl acrylate (PEA) is still more preferred. The use of such an aromatic group-containing monofunctional monomer tends to further improve the solubility of the polymerization initiator and further improve the curability of the composition. In particular, in the case of using an acylphosphine oxide polymerization initiator or a thioxanthone polymerization initiator, such a polymerization initiator tends to have high solubility. The use of phenoxyethyl (meth)acrylate tends to further reduce odor.

Examples of the aromatic group-containing monofunctional monomer in other expression include compounds represented by general formula (3) below and compounds represented by general formula (4) below.

$$CH_2=CR^4-COOR^5-Ar \qquad (3)$$

$$CH_2=CR^4-COO-Ar \qquad (4)$$

In formulas (3) and (4) above, $R^4$ is a hydrogen atom or a methyl group. In formula (3) above, Ar represents an aromatic ring skeleton and is a monovalent organic residue that has at least one aryl group and in which a carbon atom of the aryl group is bonded to the group represented by $R^5$, and $R^5$ is a divalent organic residue having 1 to 4 carbon atoms. In formula (4) above, Ar represents an aromatic ring skeleton and is a monovalent organic residue that has at least one aryl group and in which a carbon atom of the aryl group is bonded to —COO— in the formula.

In general formula (3) above, preferred examples of the group represented by $R^5$ include an optionally substituted linear, branched, or cyclic alkylene group having 1 to 4 carbon atoms, and an optionally substituted alkylene group having 1 to 4 carbon atoms and having an oxygen atom of an ether bond and/or an ester bond in the structure. Among these groups, alkylene groups having 1 to carbon atoms, such as an ethylene group, an n-propylene group, an isopropylene group, and a butylene group; and alkylene groups having 1 to 4 carbon atoms and having an oxygen atom of an ether bond in the structure, such as an oxyethylene group, an oxy-n-propylene group, an oxyisopropylene group, and an oxybutylene group, are preferably used. When the organic residue is an optionally substituted group, examples of the substituent include, but are not limited to, a carboxyl group, an alkoxy group, a hydroxyl group, and a halo group. When the substituent is a group containing a carbon atom, the carbon atom is counted as the number of carbon atoms of the organic residue.

In general formulas (3) and (4) above, examples of the at least one aryl group included in Ar (aryl) (aromatic ring skeleton) include, but are not limited to, phenyl groups and naphthyl groups. The number of aryl groups is 1 or more and preferably 1 or 2. The aryl group may have a substituent at a carbon atom other than the following carbon atoms among the carbon atoms of the aryl group: the carbon atom bonded to the organic residue represented by $R^5$ in formula (3); the carbon atom bonded to —COO— in formula (4); and, when multiple aryl groups are present, the carbon atoms connecting the aryl groups. When the aryl group has a substituent, the number of substituents per aryl group is 1 or more and preferably 1 or 2. Examples of the substituent include, but are not limited to, linear, branched, or cyclic alkyl group, alkoxy group, carboxyl group, halo group, and hydroxyl group having 1 to 10 carbon atoms.

The amount of the aromatic group-containing monofunctional monomer is preferably from 5 to 50 mass %, more preferably from 10 to 45 mass %, and still more preferably from 15 to 35 mass %, relative to the total amount of the composition. When the amount of the aromatic group-containing monofunctional monomer is in the above range, the odor tends to be further reduced, and the coating film rub fastness tends to be further improved.

2.1.1.3. Cyclic Ether Group-Containing Monofunctional Monomer

Examples of the cyclic ether group-containing monofunctional monomer include, but are not limited to, tetrahydrofurfuryl acrylate and cyclic trimethylolpropane formal acrylate. The use of such a monomer tends to reduce the odor of the composition and further improve rub fastness.

The amount of the cyclic ether group-containing monofunctional monomer is preferably from 2 to 20 mass %, more preferably from 3 to 15 mass %, and still more preferably from 5 to 12 mass %, relative to the total amount of the composition. When the amount of the cyclic ether group-containing monofunctional monomer is in the above range, the odor of the composition tends to be reduced, and the rub fastness tends to be further improved.

2.1.1.4. Aliphatic Group-Containing Monofunctional Monomer

Examples of the aliphatic group-containing monofunctional monomer include, but are not limited to, isoamyl (meth)acrylate, stearyl (meth)acrylate, lauryl (meth)acrylate, octyl (meth)acrylate, decyl (meth)acrylate, isodecyl (meth)acrylate, isomyristyl (meth)acrylate, isostearyl (meth)

acrylate, 2-hydroxybutyl (meth) acrylate, butoxyethyl (meth) acrylate, tetrahydrofurfuryl (meth) acrylate, 2-hydroxyethyl (meth)acrylate, 2-hydroxypropyl (meth)acrylate, and lactone-modified flexible (meth) acrylate. The use of such an aliphatic group-containing monofunctional monomer tends to further improve the curability of the composition.

2.1.1.4. Others

Examples of other monofunctional monomers that may be used include, in addition to the foregoing monomers, unsaturated carboxylic acids, such as (meth)acrylic acid, itaconic acid, crotonic acid, isocrotonic acid, and maleic acid; salts of the unsaturated carboxylic acids; esters, urethanes, amides, and anhydrides of unsaturated carboxylic acids; acrylonitrile, styrene, various unsaturated polyesters, various unsaturated polyethers, various unsaturated polyamides, and various unsaturated urethanes. Examples include monourethane acrylate.

2.1.2. Multifunctional Monomer

Examples of the multifunctional monomer according to this embodiment include vinyl ether group-containing (meth)acrylates, bifunctional (meth)acrylates, and tri- or monomer is not limited to the foregoing monomers.

The amount of the multifunctional monomer is preferably from 1 to 35 mass %, more preferably from 2 to 25 mass %, and still more preferably from 2 to 15 mass %, relative to the total amount of the composition. When the amount of the multifunctional monomer relative to the total amount of the composition is in the above range, the rub fastness and adhesion tend to be further improved.

Examples of the multifunctional monomer are illustrated below, but the multifunctional monomer in this embodiment is not limited to the following monomers.

2.1.2.1. Vinyl Ether Group-Containing (Meth)Acrylate

Examples of vinyl ether group-containing (meth)acrylates include, but are not limited to, compounds represented by formula (1) below. The presence of the vinyl ether group-containing (meth)acrylate tends to reduce the viscosity of the composition and further improve discharge stability. It is also possible to further improve the curability of the composition and further increase the recording speed as the curability is improved.

$$CH_2=CR^1-COOR^2-O-CH=CH-R^3 \quad (1)$$

wherein $R^1$ is a hydrogen atom or a methyl group, $R^2$ is a divalent organic residue having 2 to 20 carbon atoms, and $R^3$ is a hydrogen atom or a monovalent organic residue having 1 to 11 carbon atoms.

Examples of the divalent organic residue having 2 to 20 carbon atoms and represented by $R^2$ in formula (1) above include an optionally substituted linear, branched, or cyclic alkylene group having 2 to 20 carbon atoms; an optionally substituted alkylene group having 2 to 20 carbon atoms and having an oxygen atom of an ether bond and/or an ester bond in the structure; and an optionally substituted divalent aromatic group having 6 to 11 carbon atoms. Among these groups, alkylene groups having 2 to 6 carbon atoms, such as an ethylene group, an n-propylene group, an isopropylene group, and a butylene group; and alkylene groups having 2 to 9 carbon atoms and having an oxygen atom of an ether bond in the structure, such as an oxyethylene group, an oxy-n-propylene group, an oxyisopropylene group, and an oxybutylene group, are preferred. To further reduce the viscosity of the composition and further improve the curability of the composition, a compound having a glycol ether chain where $R^2$ is an alkylene group having 2 to 9 carbon atoms and having an oxygen atom of an ether bond in the structure, such as an oxyethylene group, an oxy n-propylene group, an oxyisopropylene group, and an oxybutylene group, is more preferred.

The monovalent organic residue having 1 to 11 carbon atoms and represented by $R^3$ in formula (1) above is preferably an optionally substituted linear, branched, or cyclic alkyl group having 1 to 10 carbon atoms, or an optionally substituted aromatic group having 6 to 11 carbon atoms. Among these, an alkyl group having 1 to 2 carbon atoms, such as a methyl group or an ethyl group, or an aromatic group having 6 to 8 carbon atoms, such as a phenyl group or a benzyl group, is preferably used.

When the above organic residues are each optionally substituted groups, the substituents are classified into groups containing a carbon atom and groups containing no carbon atom. First, when the substituent is a group containing a carbon atom, the carbon atom is counted as the number of carbon atoms of the organic residue. Examples of the group containing a carbon atom include, but are not limited to, a carboxyl group and an alkoxy group. Next, examples of the group containing no carbon atom include, but are not limited to, a hydroxyl group and a halo group.

Specific examples of the compound of formula (1) include, but are not limited to, 2-vinyloxyethyl (meth) acrylate, 3-vinyloxypropyl (meth) acrylate, 1-methyl-2-vinyloxyethyl (meth) acrylate, 2-vinyloxypropyl (meth) acrylate, 4-vinyloxybutyl (meth) acrylate, 1-methyl-3-vinyloxypropyl (meth) acrylate, 1-vinyloxymethyl propyl (meth) acrylate, 2-methyl-3-vinyloxypropyl (meth) acrylate, 1,1-dimethyl-2-vinyloxyethyl (meth) acrylate, 3-vinyloxybutyl (meth)acrylate, 1-methyl-2-vinyloxypropyl (meth)acrylate, 2-vinyloxybutyl (meth) acrylate, 4-vinyloxycyclohexyl (meth) acrylate, 6-vinyloxyhexyl (meth) acrylate, 4-vinyloxymethylcyclohexylmethyl (meth) acrylate, 3-vinyloxymethylcyclohexylmethyl (meth) acrylate, 2-vinyloxymethylcyclohexylmethyl (meth) acrylate, p-vinyloxymethylphenylmethyl (meth) acrylate, m-vinyloxymethylphenylmethyl (meth) acrylate, o-vinyloxymethylphenylmethyl (meth) acrylate, 2-(2-vinyloxyethoxy)ethyl methacrylate, 2-(2-vinyloxyethoxy)ethyl acrylate, 2-(vinyloxyisopropoxy)ethyl (meth)acrylate, 2-(vinyloxyethoxy)propyl (meth) acrylate, 2-(vinyloxyethoxy)isopropyl (meth) acrylate, 2-(vinyloxyisopropoxy)propyl (meth) acrylate, 2-(vinyloxyisopropoxy)isopropyl (meth) acrylate, 2-(vinyloxyethoxyethoxy)ethyl (meth) acrylate, 2-(vinyloxyethoxyisopropoxy)ethyl (meth) acrylate, 2-(vinyloxyisopropoxyethoxy)ethyl (meth) acrylate, 2-(vinyloxyisopropoxyisopropoxy)ethyl (meth) acrylate, 2-(vinyloxyethoxyethoxy) propyl (meth) acrylate, 2-(vinyloxyethoxyisopropoxy)propyl (meth)acrylate, 2-(vinyloxyisopropoxyethoxy)propyl (meth)acrylate, 2-(vinyloxyisopropoxyisopropoxy)propyl (meth) acrylate, 2-(vinyloxyethoxyethoxy) isopropyl (meth)acrylate, 2-(vinyloxyethoxyisopropoxy)isopropyl (meth) acrylate, 2-(vinyloxyisopropoxyethoxy)isopropyl (meth) acrylate, 2-(vinyloxyisopropoxyisopropoxy)isopropyl (meth) acrylate, 2-(vinyloxyethoxyethoxyethoxy)ethyl (meth) acrylate, 2-(vinyloxyethoxyethoxyethoxyethoxy)ethyl (meth) acrylate, 2-(isopropenoxyethoxy)ethyl (meth) acrylate, 2-(isopropenoxyethoxyethoxy)ethyl (meth) acrylate, 2-(isopropenoxyethoxyethoxy)ethyl (meth)acrylate, 2-(isopropenoxyethoxyethoxyethoxy)ethyl (meth) acrylate, polyethylene glycol monovinyl ether (meth)acrylate, and polypropylene glycol monovinyl ether (meth) acrylate. Among these specific examples, 2-(2-vinyloxyethoxy)ethyl acrylate is particularly preferred in order to easily make a balance between the curability and the viscosity of the composition. In this embodiment, 2-(2-vinyloxyethoxy)ethyl acrylate may also be referred to as VEEA.

The amount of the vinyl ether group-containing (meth) acrylate is preferably 1 to 30 mass %, more preferably from 1 to 25 mass %, and still more preferably from 1 to 15 mass %, relative to the total amount of the composition. When the amount of the vinyl ether group-containing (meth) acrylate is in the above range, the composition tends to have low viscosity and higher curability.

2.1.2.2 Bifunctional (Meth)Acrylate

Examples of bifunctional (meth)acrylates include, but are not limited to, dipropylene glycol diacrylate (DPGDA), diethylene glycol di(meth)acrylate, triethylene glycol di(meth)acrylate, tetraethylene glycol di(meth)acrylate, polyethylene glycol di(meth)acrylate, dipropylene glycol dimethacrylate, tripropylene glycol di(meth)acrylate, polypropylene glycol di(meth)acrylate, 1,4-butanediol di(meth)acrylate, 1,6-hexanediol di(meth)acrylate, 1,9-nonanediol di(meth)acrylate, neopentyl glycol di(meth) acrylate, dimethylol-tricyclodecane di(meth)acrylate, ethylene oxide (EO) adduct di(meth)acrylate of bisphenol A, propylene oxide (PO) adduct di(meth)acrylate of bisphenol A, hydroxypivalic acid neopentyl glycol di(meth)acrylate, and polytetramethylene glycol di(meth)acrylate.

The amount of the bifunctional (meth)acrylate is preferably from 1 to 25 mass %, more preferably from 1 to 15 mass %, and still more preferably from 1 to 10 mass %, relative to the total amount of the composition. When the amount of the bifunctional (meth)acrylate is in the above range, the composition tends to have higher curability.

2.1.2.3 Tri- or Higher-Functional (Meth)Acrylate

Examples of tri- or higher-functional (meth)acrylates include, but are not limited to, trimethylolpropane tri(meth) acrylate, EO-modified trimethylolpropane tri(meth)acrylate, pentaerythritol tri(meth)acrylate, pentaerythritol tetra(meth) acrylate, dipentaerythritol hexa(meth)acrylate, ditrimethylolpropane tetra(meth)acrylate, glycerol propoxy tri(meth) acrylate, caprolactone-modified trimethylolpropane tri (meth)acrylate, pentaerythritolethoxy tetra(meth)acrylate, and caprolactam-modified dipentaerythritol hexa(meth) acrylate.

2.2.3. Oligomer

The oligomer according to this embodiment is a multimer, such as dimer or trimer, having a polymerizable compound as a constituent and is a compound having one or more polymerizable functional groups. The term "polymerizable compound" herein is not limited to the foregoing monofunctional monomers and the foregoing multifunctional monomers.

Examples of the oligomer include, but are not limited to, urethane acrylate oligomers including urethane as a repeating structure, polyester acrylate oligomers including ester as a repeating structure, and epoxy acrylate oligomers including epoxy as a repeating structure.

Among these, urethane acrylate oligomers are preferred, aliphatic urethane acrylate oligomers and aromatic urethane acrylate oligomers are more preferred, and aliphatic urethane acrylate oligomers are still more preferred. Urethane acrylate oligomers are preferably tetra- or lower-functional urethane acrylate oligomers and more preferably bifunctional urethane acrylate oligomers.

The use of such an oligomer tends to further improve the storage stability of the composition and further improve rub fastness.

The amount of the oligomer is preferably from 1 to 10 mass %, more preferably from 3 to 9 mass %, and still more preferably from 4 to 7 mass %, relative to the total amount of the composition. When the amount of the oligomer is in the above range, the composition tends to have higher storage stability, and a coating film tends to have higher rub fastness.

The radiation-curable ink jet composition may contain a bi- or higher-functional polymerizable compound. As used herein, the term "bi- or higher-functional polymerizable compound" refers to a multifunctional monomer and a bi- or higher-functional oligomer. The amount of the bi- or higher-functional polymerizable compound is preferably 40 mass % or less, more preferably 30 mass % or less, still more preferably 20 mass % or less, and yet still preferably 10 mass % or less, relative to the total amount of the composition. The lower limit of the amount of the bi- or higher-functional polymerizable compound is preferably but not necessarily 3 mass % or more, and more preferably 5 mass % or more. When the amount of the bi- or higher-functional polymerizable compound is in the above range, it tends to be difficult to generate portions having different glossiness.

2.2. Polymerization Initiator

The radiation-curable ink jet composition according to this embodiment preferably contains a polymerization initiator that generates an active species upon irradiation with radiation. The polymerization initiator may be used alone or in combination of two or more.

Examples of the polymerization initiator include, but are not limited to, known polymerization initiators, such as acylphosphine oxide polymerization initiators, alkylphenone polymerization initiators, titanocene polymerization initiators, and thioxanthone polymerization initiators. Among these, acylphosphine oxide polymerization initiators are preferred. The use of these polymerization initiators tends to further improve the curability of the composition, especially the curability in the curing process with UV-LED light.

Examples of acylphosphine oxide polymerization initiators include, but are not limited to, 2,4,6-trimethylbenzoyl diphenylphosphine oxide, bis(2,4,6-trimethylbenzoyl)-phenylphosphine oxide, and bis-(2,6-dimethoxybenzoyl)-2,4,4-trimethylpentyl phosphine oxide.

Examples of commercial products of such acylphosphine oxide polymerization initiators include IRGACURE 819 (bis(2,4,6-trimethylbenzoyl)-phenylphosphine oxide), IRGACURE 1800 (a mixture of bis-(2,6-dimethoxybenzoyl)-2,4,4-trimethylpentylphosphine oxide and 1-hydroxycyclohexyl-phenyl ketone in a mass ratio of 25:75), and IRGACURE TPO (2,4,6-trimethylbenzoyl diphenylphosphine oxide) (these products are all available from BASF SE).

The amount of the polymerization initiator is preferably from 1 to 15 mass %, more preferably from 2.5 to 12.5 mass %, and still more preferably from 5 to 10 mass %, relative to the total amount of the composition. When the amount of the polymerization initiator is in the above range, the curability of the composition and the solubility of the polymerization initiator tend to be further improved.

2.3. Other Additives

The radiation-curable ink jet composition according to this embodiment may further contain additives, such as a colorant, a dispersant, a polymerization inhibitor, a surfactant, and a photosensitizer, as necessary.

2.3.1. Colorant

The radiation-curable ink jet composition according to this embodiment may further contain a colorant. The radiation-curable ink jet composition according to this embodiment containing a colorant can be used as a colored radiation-curable ink jet composition. The colorant may be at least one of a pigment and a dye.

The colorant is preferably a coloring ink for the purpose of coloring, and more preferably a chromatic color ink or a black ink in order to reduce gloss difference and improve surface smoothness. Examples of the color of the chromatic color ink include cyan, yellow, magenta, orange, and green.

The total amount of the colorant is preferably from 1 to 20 mass %, more preferably from 1 to 15 mass %, still more preferably from 1 to 10 mass %, and yet still more preferably from 2 to 5 mass %, relative to the total amount of the composition. The radiation-curable ink jet composition according to this embodiment may be a clear ink that does not contain a colorant or contains a colorant in an amount not intended for coloring, for example, in an amount of 0.1 mass % or less.

2.3.1.1. Pigment

The use of a pigment as a colorant can improve the light resistance of the radiation-curable ink jet composition. The pigment may be either an inorganic pigment or an organic pigment. The pigment may be used alone or in combination of two or more.

Examples of inorganic pigments that can be used include carbon black (Colour Index (C.I.) Generic Name Pigment Black 7), such as furnace black, lamp black, acetylene black, and channel black; iron oxide; and titanium oxide.

Examples of organic pigments include azo pigments, such as insoluble azo pigments, condensed azo pigments, azo lakes, and chelate azo pigments; polycyclic pigments, such as phthalocyanine pigments, perylene and perinone pigments, anthraquinone pigments, quinacridone pigments, dioxane pigments, thioindigo pigments, isoindolinone pigments, and quinophthalone pigments; dye chelates (e.g., basic dye chelates and acid dye chelates); dye lakes (basic dye lakes and acid dye lakes); nitro pigments, nitroso pigments, aniline black, and daylight fluorescent pigments.

Specific examples of carbon black used for black include No. 2300, No. 900, MCF 88, No. 33, No. 40, No. 45, No. 52, MA 7, MA 8, MA 100, No. 2200B, and the like (these products are available from Mitsubishi Chemical Corporation); Raven 5750, Raven 5250, Raven 5000, Raven 3500, Raven 1255, Raven 700, and the like (these products are available from Carbon Columbia); Regal 400R, Regal 330R, Regal 660R, Mogul L, Monarch 700, Monarch 800, Monarch 880, Monarch 900, Monarch 1000, Monarch 1100, Monarch 1300, Monarch 1400, and the like (available from Cabot Japan K.K.); and Color Black FW1, Color Black FW2, Color Black FW2V, Color Black FW18, Color Black FW200, Color Black 5150, Color Black 5160, Color Black 5170, Printex 35, Printex U, Printex V, Printex 140U, Special Black 6, Special Black 5, Special Black 4A, and Special Black 4 (these products are available from Degussa AG).

Examples of pigments used for white include C.I. Pigment White 6, 18, and 21.

Examples of pigments used for yellow include C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 155, 167, 172, and 180.

Examples of pigments used for magenta include C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, and 245, and C.I. Pigment Violet 19, 23, 32, 33, 36, 38, 43, and 50.

Examples of pigments used for cyan include C.I. Pigment Blue 1, 2, 3, 15, 15:1, 15:2, 15:3, 15:34, 15:4, 16, 18, 22, 25, 60, 65, and 66, and C.I. Vat Blue 4 and 60.

Examples of pigments other than pigments for magenta, cyan, and yellow include C.I. Pigment Green 7 and 10, C.I. Pigment Brown 3, 5, 25, and 26, and C.I. Pigment Orange 1, 2, 5, 7, 13, 14, 15, 16, 24, 34, 36, 38, 40, 43, and 63.

The amount of the pigment is preferably from 1 to 20 mass %, more preferably from 1 to 15 mass %, and still more preferably from 1 to 10 mass %, relative to the total amount of the composition.

2.3.1.2. Dye

The colorant may be a dye. Examples of the dye that can be used include, but are not limited to, acid dyes, direct dyes, reactive dyes, and basic dyes. The dye may be used alone or in combination of two or more.

2.3.2. Dispersant

When the radiation-curable ink jet composition contains a pigment, the composition may further contain a dispersant in order to improve pigment dispersibility. The dispersant may be used alone or in combination of two or more.

Examples of the dispersant include, but are not limited to, dispersants commonly used for preparing a pigment dispersion, such as polymer dispersants. Specific examples include dispersants containing, as a main component, one or more selected from polyoxyalkylene polyalkylene polyamines, vinyl polymers and copolymers, acrylic polymers and copolymers, polyesters, polyamides, polyimides, polyurethanes, amino polymers, silicon-containing polymers, sulfur-containing polymers, fluorine-containing polymers, and epoxy resins.

Examples of commercial products of polymer dispersants include AJISPER series available from Ajinomoto Fine-Techno Co., Inc., Solsperse series (e.g., Solsperse 36000) available from Avecia, Inc. or Noveon, Inc., DISPERBYK series available from BYK Additives & Instruments, and DISPARLON series available from Kusumoto Chemicals, Ltd.

The amount of the dispersant is preferably from 0.05 to 2 mass %, more preferably from 0.05 to 1 mass %, and still more preferably from 0.05 to 0.5 mass %, relative to the total amount of the composition.

2.3.3. Polymerization Inhibitor

The radiation-curable ink jet composition according to this embodiment may further contain a polymerization inhibitor. The polymerization inhibitor may be used alone or in combination of two or more.

Examples of the polymerization inhibitor include, but are not limited to, p-methoxyphenol, hydroquinone monomethyl ether (MEHQ), 4-hydroxy-2,2,6,6-tetramethylpiperidin-N-oxyl, hydroquinone, cresol, t-butylcatechol, 3,5-di-t-butyl-4-hydroxytoluene, 2,2'-methylenebis(4-methyl-6-t-butylphenol), 2,2'-methylenebis(4-ethyl-6-butylphenol), 4,4'-thiobis(3-methyl-6-t-butylphenol), and hindered amine compounds.

The amount of the polymerization inhibitor is preferably from 0.05 to 1 mass %, more preferably from 0.05 to 0.5 mass %, relative to the total amount of the composition.

2.3.4. Surfactant

The radiation-curable ink jet composition according to this embodiment may further contain a surfactant. The surfactant may be used alone or in combination of two or more.

The surfactant is preferably a silicone surfactant, and more preferably a polyester-modified silicone or a polyether-modified silicone. Examples of the polyether-modified silicone include BYK-378, BYK-3455, BYK-UV 3500, BYK-UV 3510, and BYK-UV 3530 (these products are available from BYK Additives & Instruments). Examples of the polyester-modified silicone include BYK-3570 (available from BYK Additives & Instruments).

The amount of the surfactant is preferably from 0.01 to 2 mass %, and more preferably from 0.05 to 1 mass %, relative to the total amount of the composition.

2.3.5. Photosensitizer

The radiation-curable ink jet composition according to this embodiment may further contain a photosensitizer. Examples of the photosensitizer include amine compounds (e.g., aliphatic amines, aromatic group-containing amines, piperidine, reaction products between epoxy resins and amines, and triethanolamine triacrylate), urea compounds (e.g., allyl thiourea and o-tolylthiourea), sulfur compounds (e.g., sodium diethyl dithiophosphate, soluble salts of aromatic sulfinic acids), nitrile compounds (e.g., N,N-diethyl-p-aminobenzonitrile), phosphorus compounds (e.g., tri-n-butylphosphine and sodium diethyldithiophosphide), nitrogen compounds (e.g., Michler's ketone, N-nitrosohydroxylamine derivatives, oxazolidine compounds, tetrahydro-1,3-oxazine compound, and a condensate of diamine and formaldehyde or acetaldehyde), and chlorine compounds (e.g., carbon tetrachloride and hexachloroethane).

2.4. Method for Manufacturing Composition

The radiation-curable ink jet composition is manufactured (prepared) by mixing components to be contained in the composition and stirring the mixture so as to sufficiently uniformly mix the components. In this embodiment, the process for preparing the radiation-curable ink jet composition preferably includes a step of subjecting a mixture of the polymerization initiator and at least part of monomers to at least one of an ultrasonic treatment and a heat treatment. This step can reduce the amount of oxygen dissolved in the prepared composition and enables the radiation-curable ink jet composition to have high discharge stability and high storage stability. The mixture contains at least the above components. The mixture may further contain other components to be contained in the radiation-curable ink jet composition or may contain all components to be contained in the radiation-curable ink jet composition. The mixture contains at least part of monomers to be contained in the radiation-curable ink jet composition.

3. Ink Jet Apparatus

An ink jet apparatus according to an embodiment includes: an ink jet head that discharges a predetermined composition onto a recording medium; and a radiation source that emits radiation to the composition attached to the recording medium. The radiation-curable ink jet composition according to the above embodiment is used as the composition. The ink jet apparatus is used for performing the ink jet method according to the above embodiment.

The ink jet head uses the radiation-curable ink jet composition as the composition to be discharged. The ink jet head includes: a first nozzle group including multiple nozzles in a column direction; and a second nozzle group including multiple nozzles in the column direction. The first nozzle group and the second nozzle group are arranged at different positions from each other in the column direction and in a scanning direction intersecting the column direction.

The ink jet apparatus according to this embodiment may use a line system or a serial system. However, the ink jet apparatus preferably uses a serial system including a carriage carrying an ink jet head. The ink jet head discharges the radiation-curable ink jet composition when the carriage is scanned in the width direction of a recording medium. In particular, in the case of a serial ink jet head, a carriage carrying an ink jet head preferably further carries a radiation source disposed at a side of the ink jet head opposite to the scanning direction. This configuration achieves high-speed printing and enables the obtained recorded article to have high definition and high color development in this embodiment as described above.

Figure 2:
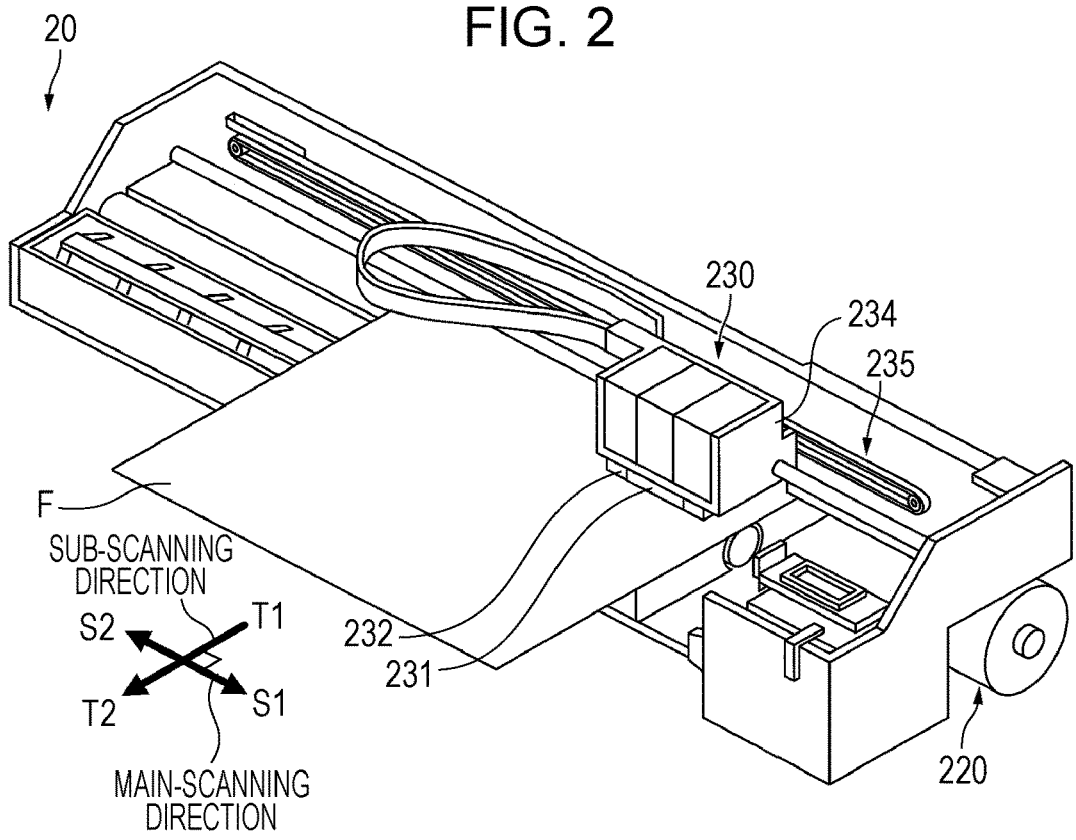
FIG. 2 is a perspective view of a serial ink jet apparatus in an embodiment.

FIG. 2 is a perspective view of a serial printer, which is an example ink jet apparatus. As shown in FIG. 2, a serial printer 20 includes a transport unit 220 and a recording unit 230. The transport unit 220 transports, to the recording unit 230, a recording medium F fed to the serial printer and discharges the recording medium to the outside of the serial printer after recording. Specifically, the transport unit 220 has feed rollers and transports the fed recording medium F in a sub-scanning direction T1.

The recording unit 230 includes an ink jet head 231, which discharges the composition onto the recording medium F fed from the transport unit 220; a radiation source 232, which emits radiation to the attached composition; a carriage 234, which carries the ink jet head 231 and the radiation source 232; and a carriage movement mechanism 235, which moves the carriage 234 in the main-scanning directions S1 and S2 of the recording medium F.

A serial printer includes, as the ink jet head 231, a head having a length smaller than the width of a recording medium and performs multiple pass (multi-pass) recording as the head moves. In a serial printer, the carriage 234 which moves in a predetermined direction carries the head 231 and the radiation source 232, and the composition is discharged onto the recording medium as the head moves in conjunction with the movement of the carriage. Recording with two passes or more (multi-pass) is performed accordingly. The pass is also referred to as main scanning. Sub-scanning for transporting the recording medium is performed between passes. In other words, main scanning alternates with sub-scanning.

FIG. 2 shows the radiation source carried by the carriage, but the present disclosure is not limited to this configuration. The printer may include a radiation source that is not carried by the carriage.

The ink jet apparatus according to this embodiment is not limited to the above serial printer and may be the above line printer.

3.2 Ink Jet Head

An ink jet head according to an embodiment is used as an ink jet head of the ink jet apparatus and has the same structure as the ink jet head of the ink jet apparatus. The ink jet head is used to discharge the radiation-curable composition.

4. Recorded Article

A recorded article according to an embodiment is obtained by attaching the radiation-curable ink jet composition to a recording medium and curing the radiation-curable ink jet composition. The composition having high flexibility and high adhesion can prevent cracking and chipping of a coating film in post-processing such as cutting or bending. The recorded article according to this embodiment can thus be preferably used for sign applications.

Examples of the material of the recording medium include, but are not limited to, plastics, such as polyvinyl chloride, polyethylene terephthalate, polypropylene, polyethylene, polycarbonate, cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate, polyvinyl acetal; surface-treated products of these plastics; glass, paper, metal, and wood.

The form of the recording medium is not limited either. Examples of the form include films, boards, and fabrics.

5. Set

A set according an embodiment includes the radiation-curable ink jet composition and the ink jet head. This configuration tends to further reduce gloss difference. The ink jet head is used as an ink jet head of the ink jet apparatus. The radiation-curable ink jet composition is discharged from the ink jet head. The set is used in the ink jet method.

EXAMPLES

The present disclosure will be described below in more detail by way of Examples. The present disclosure is not limited by Examples below.

1. Preparation of Ink Jet Composition

First, a colorant, a dispersant, and part of each monomer were weighed and placed in a pigment dispersion tank, and ceramic beads having a diameter of 1 mm were placed in the tank. The mixture was stirred to form a pigment dispersion in which the colorant was dispersed in the monomers. Next, the remaining monomers, a polymerization initiator, and a polymerization inhibitor were placed in a mixture tank, which was a stainless steel container, so as to obtain the composition described in Table 1. The mixture was mixed and stirred to complete dissolution. Subsequently, the pigment dispersion formed as described above was placed in the mixture tank, and the mixture was then mixed and stirred at normal temperature for 1 hour and further filtered through a 5 μm membrane filter to obtain a radiation-curable ink jet composition in Example. The value for each component shown in Examples in Table is on a mass % basis.

TABLE 1

| | | Ink No. | | | | | | | | | | | | |
|---|---|---|---|---|---|---|---|---|---|---|---|---|---|---|
| | | 1 | 2 | 3 | 4 | 5 | 6 | 7 | 8 | 9 | 10 | 11 | 12 | 13 |
| Nitrogen-containing monofunctional monomer | ACMO | 10.0 | 15.0 | 20.0 | 25.0 | 25.0 | 5.0 | — | — | 15.0 | 15.0 | — | 3.0 | 30.0 |
| | n-VC | — | — | — | — | 15.0 | — | 10.0 | 15.0 | — | — | — | — | 15.0 |
| Other monofunctional monomers | PEA | 30.2 | 27.2 | 25.2 | 23.2 | 15.2 | 35.2 | 30.2 | 27.2 | 24.2 | 18.2 | 35.2 | 32.2 | 10.2 |
| | IBXA | 25.0 | 23.0 | 20.0 | 17.0 | 10.0 | 25.0 | 25.0 | 23.0 | 19.0 | 11.0 | 30.0 | 30.0 | 10.0 |
| | DCPA | 5.0 | 5.0 | 5.0 | 5.0 | 5.0 | 5.0 | 5.0 | 5.0 | 4.0 | 3.0 | 5.0 | 5.0 | 5.0 |
| | THFA | 5.0 | 5.0 | 5.0 | 5.0 | 5.0 | 5.0 | 5.0 | 5.0 | 4.0 | 3.0 | 5.0 | 5.0 | 5.0 |
| | CTFA | 5.0 | 5.0 | 5.0 | 5.0 | 5.0 | 5.0 | 5.0 | 5.0 | 4.0 | 3.0 | 5.0 | 5.0 | 5.0 |
| Multifunctional monomer | VEEA | 2.0 | 2.0 | 2.0 | 2.0 | 2.0 | 2.0 | 2.0 | 2.0 | 12.0 | 26.0 | 2.0 | 2.0 | 2.0 |
| | DPGDA | 2.0 | 2.0 | 2.0 | 2.0 | 2.0 | 2.0 | 2.0 | 2.0 | 2.0 | 5.0 | 2.0 | 2.0 | 2.0 |
| Oligomer | CN991 | 5.0 | 5.0 | 5.0 | 5.0 | 5.0 | 5.0 | 5.0 | 5.0 | 5.0 | 5.0 | 5.0 | 5.0 | 5.0 |
| Polymerization initiator | Ir819 | 4.0 | 4.0 | 4.0 | 4.0 | 4.0 | 4.0 | 4.0 | 4.0 | 4.0 | 4.0 | 4.0 | 4.0 | 4.0 |
| | TPO | 4.0 | 4.0 | 4.0 | 4.0 | 4.0 | 4.0 | 4.0 | 4.0 | 4.0 | 4.0 | 4.0 | 4.0 | 4.0 |
| Pigment | Carbon black | 2.0 | 2.0 | 2.0 | 2.0 | 2.0 | 2.0 | 2.0 | 2.0 | 2.0 | 2.0 | 2.0 | 2.0 | 2.0 |
| Dispersant | SOL36000 | 0.2 | 0.2 | 0.2 | 0.2 | 0.2 | 0.2 | 0.2 | 0.2 | 0.2 | 0.2 | 0.2 | 0.2 | 0.2 |
| Polymerization inhibitor | MEHQ | 0.1 | 0.1 | 0.1 | 0.1 | 0.1 | 0.1 | 0.1 | 0.1 | 0.1 | 0.1 | 0.1 | 0.1 | 0.1 |
| Surfactant | BYK-UV3500 | 0.5 | 0.5 | 0.5 | 0.5 | 0.5 | 0.5 | 0.5 | 0.5 | 0.5 | 0.5 | 0.5 | 0.5 | 0.5 |
| Total | | 100.0 | 100.0 | 100.0 | 100.0 | 100.0 | 100.0 | 100.0 | 100.0 | 100.0 | 100.0 | 100.0 | 100.0 | 100.0 |
| Nitrogen-containing monofunctional monomer content (mass %) | | 10.0 | 15.0 | 20.0 | 25.0 | 40.0 | 5.0 | 10.0 | 15.0 | 15.0 | 15.0 | 0.0 | 3.0 | 45.0 |
| Monofunctional monomer content (mass %) | | 80.2 | 80.2 | 80.2 | 80.2 | 80.2 | 80.2 | 80.2 | 80.2 | 70.2 | 53.2 | 80.2 | 80.2 | 80.2 |

The abbreviations and the components of products used in Table 1 are as described below.

Monofunctional Monomer
ACMO (available from KJ Chemicals Corporation, acryloylmorpholine)
NVC (available from ISP Japan, Ltd., N-vinylcaprolactam)
PEA (trade name "Viscoat #192" available from Osaka Organic Chemical Industry Ltd., phenoxyethyl acrylate)
IBXA (available from Osaka Organic Chemical Industry Ltd., isobornyl acrylate)
DCPA (available from Hitachi Chemical Co., Ltd., dicyclopentenyl acrylate)
THFA (available from Hitachi Chemical Co., Ltd., tetrahydrofurfuryl acrylate)
CTFA (trade name "Viscoat #200" available from Osaka Organic Chemical Industry Ltd., cyclic trimethylolpropane formal acrylate)

Multifunctional Monomer
VEEA (available from Nippon Shokubai Co., Ltd., 2-(2-vinyloxyethoxy)ethyl acrylate)
DPGDA (trade name "SR508" available from Sartomer, dipropylene glycol diacrylate)

Oligomer
CN991 (available from Sartomer, bifunctional urethane acrylate oligomer)

Polymerization Initiator
Irg. 819 (trade name "IRGACURE 819" available from BASF SE, bis(2,4,6-trimethylbenzoyl)-phenylphosphine oxide)
TPO (trade name "IRGACURE TPO" available from BASF SE, 2,4,6-trimethylbenzoyl diphenylphosphine oxide)

Dispersant
Solsperse 36000 (available from The Lubrizol Corporation, polymer dispersant)

Colorant (Pigment)
Carbon black (trade name "MA-100" available from Mitsubishi Chemical Corporation)

Polymerization Inhibitor
MEHQ (trade name "p-methoxyphenol" available from Kanto Chemical Co., Inc., hydroquinone monomethyl ether)

Surfactant
BYK-UV 3500 (available from BYK Additives & Instruments, acryloyl group-containing polyether-modified polydimethylsiloxane)

2. Recording Test

2.1. Printer Structure P1

A printer having a printer structure P1 is a serial printer produced by modifying an ink jet recording apparatus (trade name "SC-530650" available from Seiko Epson Corporation). An ink jet head includes four nozzle groups disposed in a staggered arrangement as shown in FIG. 1. The nozzle density is 300 dpi, each nozzle group has a length of 1 inch in the direction T, and the number of nozzles is 300. The ink jet head has a total length of 4 inches in the direction T, and the total number of nozzles is 1200. Each nozzle has a diameter of 20 μm.

The composition prepared as described above was charged into four nozzle groups. The distance L in the scanning direction between the first nozzle group G1 and the second nozzle group G2 arranged at different positions from each other in the scanning directions S1 and S2 in FIG. 1 was the value shown in Table 2. The distance L is the distance between the center of one nozzle group and the center of the other nozzle group in the scanning direction.

An LED was disposed at each of the left and right sides of the ink jet head on the carriage. The peak wavelength of the LEDs used as radiation sources was 395 nm. The radiation sources had the same straight length as the ink jet head in the vertical direction T. The distances from the center of the entire head to the left and right light sources in the scanning direction were substantially the same and were 160 cm. The irradiance of ultraviolet radiation from the LEDs was the value in Table 2. The irradiance was measured by using an UV Radiometer UM-10 (receptor head UM-400) available from Konica Minolta Sensing. The measured irradiance is the irradiance at a distance between the LED light source and the surface of a recording medium during recording.

The composition discharged and landed in scanning was irradiated with ultraviolet radiation from the downstream radiation source in the carriage in the same scanning as in the discharging step. In this case, the radiation energy in one time of irradiation was 200 mJ/cm$^2$. The emission surface of the light source had a shutter. The shutter was configured to limit the irradiation area and control the irradiation time during which a certain point on a recording medium was irradiated with ultraviolet radiation in scanning. The irradiation time was controlled to produce the above radiation energy. The radiation energy was calculated from intensity× irradiation time (s).

Bidirectional printing was performed at a scanning speed of 500 mm/s. The scanning speed here refers to the carriage moving speed for serial printers and to the medium transport speed for line printers.

The ink jet head further included a heating mechanism. The composition was discharged after the heating temperature was controlled for each composition such that the viscosity of the composition did not exceed 12 mPa·s.

2.2. Printer Structure P2

The printer structure P2 was produced by modifying L-4533A available from Seiko Epson Corporation into a line printer. A line head was formed by arranging multiple chips C in FIG. 1 in the vertical direction T of FIG. 1 and connecting the chips C to each other at upper and lower protrusion portions E so that the nozzles were not interrupted in the column direction. The nozzle density was 600 npi. An LED light source having the same straight length as the head was disposed at a position 160 cm downstream of the line head in the medium transport direction.

2.3. Printer Structure P3

The printer structure P3 was the same as the printer structure P1 except that only the top two nozzle groups of the ink jet head in FIG. 1 in the direction T were used, and the remaining two nozzle groups were closed and not in use. In other words, the length of the ink jet head was 2 inches.

2.4. Printer Structure P4

The printer structure P4 was the same as the printer structure P1 except that only the top first and third nozzle groups of the ink jet head in FIG. 1 in the direction T were used, and the remaining two nozzle groups were closed and not in use. In other words, the ink jet head did not have staggered nozzle groups. The total length of the ink jet head was 2 inches.

2.5. Recording Conditions

The recording conditions were a recording resolution of 600×600 dpi and the number of scans as described in Table 2. The number of scans can be calculated in accordance with the following formula. The number of scans refers to the number of times the head faces a certain point on a recording medium during scanning. Dots can be attached separately with this number of times of scanning. The printer structure P2, which corresponds to a line printer, is associated with one scan printing. A PVC film (JT 5829 R available from Mactac) was used as a recording medium. The number of scans=head length/approximate distance of one sub-scanning

3. Evaluation Method

3.1. Evaluation of Gloss Difference

A 30×30 cm pattern was recorded in the recording test. The obtained pattern was angled so as to reflect a fluorescent light, and the glossiness was visually observed. Accordingly, the gloss banding extending in the scanning direction and found in portions having different glossiness was observed. The evaluation criteria for gloss difference are described below.

Evaluation Criteria

A No gloss banding was observed even when the recorded article was placed at a distance of 50 cm from the fluorescent light.

B Gloss banding was observed when the recorded article was placed at a distance of 50 cm from the fluorescent light, but no gloss banding was observed at a distance of 3 m.

C Slight gloss banding was observed when the recorded article was placed at a distance of 3 m from the fluorescent light.

D Clear gloss banding was observed when the recorded article was placed at a distance of 3 m from the fluorescent light.

3.2. Surface Smoothness

A 10×10 cm solid pattern was recorded in the same manner as in the recording test except that the composition was attached while the dot density in the scanning direction was controlled such that the amount of the composition attached was 10 μm/inch$^2$. The surface smoothness was evaluated by visually observing the obtained solid pattern. The evaluation criteria are described below.

Evaluation Criteria

A The pattern surface has glossiness and no unevenness.

B The pattern surface has no unevenness but low glossiness.

C The pattern surface has no glossiness and slight unevenness.

D The pattern surface has no glossiness and noticeable unevenness.

3.3. Discharge Stability

Recording was continuously performed for 120 minutes under the same conditions as in the recording test. After recording, the presence of nozzle discharge defect (misfiring or landing position shift) was examined. The landing position shift from the original landing position by a distance equal to or more than half the distance between the nozzle and the adjacent nozzle is defined as a discharge defect. A nozzle that causes misfiring or landing position shift is defined as a discharge defective nozzle. The evaluation criteria are as described below.

Evaluation Criteria

A The percentage of discharge defective nozzles is less than 1%. There is no misfiring.

B The percentage of discharge defective nozzles is 1% or more and less than 3%. There is no misfiring.

C The percentage of discharge defective nozzles is 3% or more and less than 6%. There is no misfiring.

D There is misfiring of discharge defective nozzles.

3.4. Adhesion

A recorded pattern area of the recorded article obtained in the recording test was subjected to evaluation of the cross-cut test in accordance with JIS K5600-5-6. More specifically, a 10×10 grid pattern was formed by making cross-cuts at intervals of 1 mm using a cutter with the blade of the cutting tool placed on a coating film at right angles. A transparent adhesive tape (25 mm wide) having a length of about 75 mm was attached to the grid, and the tape was rubbed with a finger sufficiently so as to allow the cured film to be seen through the tape. Next, the tape was assuredly peeled off from the cured film at an angle near 60° in 0.5 to 1.0 seconds within 5 minutes after the tape was attached, and the grid condition was visually observed. The evaluation criteria are as described below.

Evaluation Criteria

A No peeling of the cured film is observed in the grid.

B Peeling of the cured film is observed in less than 5% of the grid.

C Peeling of the cured film is observed in 5% or more and less than 35% of the grid.

D Peeling of the cured film is observed in 35% or more of the grid.

TABLE 2

| | Example | | | | | | | | | | | | | | | | | | | | |
|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 |
| Ink No. | 1 | 2 | 3 | 4 | 5 | 6 | 7 | 8 | 9 | 10 | 1 | 1 | 1 | 1 | 2 | 2 | 1 | 1 | 1 | 1 | 6 |
| Printer structure | P1 | P1 | P1 | P1 | P1 | P1 | P1 | P1 | P1 | P1 | P1 | P1 | P1 | P1 | P1 | P1 | P1 | P1 | P3 | P2 | P2 |
| Distance (mm) between nozzle groups | 20 | 20 | 20 | 20 | 20 | 20 | 20 | 20 | 20 | 20 | 13 | 26 | 20 | 20 | 20 | 20 | 20 | 20 | 20 | 20 | 20 |
| Irradiance (W/cm$^2$) | 6 | 6 | 6 | 6 | 6 | 6 | 6 | 6 | 6 | 6 | 6 | 6 | 4 | 8 | 6 | 6 | 6 | 6 | 6 | 6 | 6 |
| Droplet weight (ng) | 15 | 15 | 15 | 15 | 15 | 15 | 15 | 15 | 15 | 15 | 15 | 15 | 15 | 15 | 10 | 5 | 15 | 15 | 15 | 15 | 15 |
| Number of scans | 8 | 8 | 8 | 8 | 8 | 8 | 8 | 8 | 8 | 8 | 8 | 8 | 8 | 8 | 8 | 8 | 16 | 4 | 8 | 1 | 1 |
| Gloss difference | B | A | A | A | A | C | A | A | B | C | A | C | C | A | B | C | A | C | B | A | A |
| Surface smoothness | A | A | B | B | C | A | B | C | B | B | A | A | A | B | B | B | A | B | A | A | A |
| Discharge stability | A | A | A | B | C | A | B | C | A | A | A | A | A | B | A | A | A | A | A | A | A |
| Adhesion | C | B | B | B | A | C | A | A | B | B | C | C | C | B | B | B | C | C | C | C | C |

| | Comparative Example | | | Reference Example | | | |
|---|---|---|---|---|---|---|---|
| | 1 | 2 | 3 | 1 | 2 | 3 | 4 |
| Ink No. | 11 | 12 | 13 | 11 | 12 | 13 | 1 |
| Printer structure | P1 | P1 | P1 | P4 | P4 | P4 | P4 |
| Distance (mm) between nozzle groups | 20 | 20 | 20 | — | — | — | — |
| Irradiance (W/cm$^2$) | 6 | 6 | 6 | 6 | 6 | 6 | 6 |
| Droplet weight (ng) | 15 | 15 | 15 | 15 | 15 | 15 | 15 |
| Number of scans | 8 | 8 | 8 | 8 | 8 | 8 | 8 |
| Gloss difference | D | D | A | A | A | A | A |
| Surface smoothness | A | A | D | A | A | D | A |
| Discharge stability | A | A | D | A | A | D | A |
| Adhesion | D | D | A | D | D | A | C |

3. Evaluation Results

Table shows the components of the radiation-curable ink jet compositions used in Examples and the evaluation results. In Table, Examples which were ink jet methods according to this embodiment all showed great reduction in gloss difference and high surface smoothness. However, Comparative Examples which were ink jet methods that did not correspond to this embodiment all showed either poor reduction in gloss difference or low surface smoothness.

Specifically, in Examples 1 to 5, 6, and the like, the reduction in gloss difference and the adhesion increased as the amount of nitrogen-containing monomer increased and the surface smoothness and the discharge stability increased as the amount of nitrogen-containing monomer decreased. In Examples 1 and 7, and 2 and 8, a cyclic amide monomer was advantageous to further reduce gloss difference, but a nitrogen-containing heterocyclic monomer was advantageous in terms of surface smoothness. In Examples 9 and 10, the reduction in gloss difference and the surface smoothness increased as the amount of monofunctional monomer increased. In Examples 20 and 21, the reduction in gloss difference was greater in the line system. In Comparative Examples 1 and 2, the gloss difference was poor when no nitrogen-containing monofunctional monomer was contained or the amount of the nitrogen-containing monofunctional monomer was too small. In Comparative Example 3, the surface smoothness was impaired when the amount of the nitrogen-containing monofunctional monomer was too large. In Reference Examples, no gloss difference was generated when an ink jet head including multiple nozzle groups arranged at different positions from each other in the scanning direction was not used. Although Comparative Examples 1 and 2 used inks that did not contain any nitrogen-containing monofunctional monomer or contained an excessively small amount of nitrogen-containing monofunctional monomer, no gloss difference was generated and there was no problem associated with gloss difference. However, in the case of using the printer structure P4, the number of nozzle groups was small, and it was necessary to shorten the distance of one sub-scanning in order to perform recording with the same number of scans compared with the printer structure P1, resulting in low recording speed. This indicates that this embodiment is useful for increasing the recording speed using the ink jet head as used in this embodiment. Although not described in Table, testing with the line system under the conditions of Example 20 using Ink No. 11 shows that the reduction in gloss difference under these conditions was better than that in Comparative Example 1. Although gloss difference was reduced, there was a tendency for the dot diameter to differ between nozzle groups as the image was observed with a loupe. This indicates that the line system is also effective for improving image quality in terms of difficulty in generation of differences in dot diameter.

What is claimed is:

1. An ink jet method comprising:
   a discharging step of discharging a radiation-curable ink jet composition from an ink jet head; and
   an irradiating step of irradiating the discharged radiation-curable ink jet composition with radiation, wherein
   the ink jet head includes a first nozzle group including a plurality of nozzles in a column direction and a second nozzle group including a plurality of nozzles in the column direction, and the first nozzle group and the second nozzle group are arranged at different positions from each other in the column direction and in a scanning direction intersecting the column direction,
   in the discharging step, a scan that involves discharging the radiation-curable ink jet composition from the first nozzle group and the second nozzle group while the ink jet head is scanned in the scanning direction is performed,
   in the irradiating step, the radiation is emitted from a radiation source disposed at a side of the ink jet head opposite to the scanning direction,
   the radiation-curable ink jet composition contains a monofunctional monomer including a nitrogen-containing monofunctional monomer, an amount of the monofunctional monomer being 80 mass % or more relative to a total amount of the radiation-curable ink jet composition, and
   an amount of the nitrogen-containing monofunctional monomer is from 5 to 20 mass % relative to the total amount of the radiation-curable ink jet composition.

2. The ink jet method according to claim 1, wherein
   the discharging step involves discharging the radiation-curable ink jet composition from the ink jet head while a carriage carrying the ink jet head and the radiation source disposed at a side of the ink jet head opposite to the scanning direction is scanned in the scanning direction,
   the irradiating step involves irradiating the radiation-curable ink jet composition discharged in the scanning with radiation from the radiation source in the same scanning as in the discharging step, and
   the scanning is performed a plurality of times.

3. The ink jet method according to according to claim 1, wherein the nitrogen-containing monofunctional monomer includes either a monofunctional monomer having a nitrogen-containing heterocyclic ring or a monofunctional monomer having a cyclic amide structure.

4. The ink jet method according to claim 1, wherein the nitrogen-containing monofunctional monomer includes acryloylmorpholine.

5. The ink jet method according to claim 1, wherein an amount of the monofunctional monomer 80 to 95 mass % relative to the total amount of the radiation-curable ink jet composition.

6. The ink jet method according to claim 1, wherein
   the radiation-curable ink jet composition contains a bi- or higher-functional polymerizable compound, and
   an amount of the bi- or higher-functional polymerizable compound is 20 mass % or less relative to the total amount of the radiation-curable ink jet composition.

7. The ink jet method according to claim 1, wherein the amount of the nitrogen-containing monofunctional monomer is from 7 to 20 mass % relative to the total amount of the radiation-curable ink jet composition.

8. The ink jet method according to claim 1, wherein a radiation energy in one time of irradiation during the irradiation is from 50 to 300 J/cm2.

9. The ink jet method according to claim 1, wherein the radiation is ultraviolet radiation having an emission peak wavelength of from 360 to 420 nm.

10. The ink jet method according to claim 1, wherein a distance in the scanning direction between the first nozzle group and the second nozzle group is from 10 to 30 mm.

11. The ink jet method according to claim 1, wherein main curing is performed by one time of irradiation during the irradiation.

12. The ink jet method according to claim 1, wherein the radiation-curable ink jet composition contains, as the monofunctional monomer, either a monofunctional monomer having an aromatic ring or a monofunctional monomer having an alicyclic ring.

13. The ink jet method according to claim 1, wherein an ink weight per dot discharged in the discharging step is 20 ng/dot or less.

14. The ink jet method according to claim 1, wherein the first nozzle group and the second nozzle group each have a nozzle density of from 150 to 600 npi in the column direction.

15. The ink jet method according to claim 1, wherein the first nozzle group and the second nozzle group each have a length of from 1 to 5 inches in the column direction.

16. The ink jet method according to claim 1, wherein the ink jet method is a recording method for performing recording on a recording medium,
the discharging step involves attaching the discharged radiation-curable ink jet composition to the recording medium, and
the irradiating step involves irradiating, with the radiation, the radiation-curable ink jet composition attached to the recording medium.

17. An ink jet apparatus comprising:
an ink jet head that discharges a radiation-curable ink jet composition; and
a radiation source that emits radiation to the discharged radiation-curable ink jet composition, wherein
the ink jet head includes a first nozzle group including a plurality of nozzles in a column direction and a second nozzle group including a plurality of nozzles in the column direction, and the first nozzle group and the second nozzle group are arranged at different positions from each other in the column direction and in a scanning direction intersecting the column direction,
the radiation source is disposed at a side of the ink jet head opposite to the scanning direction when the ink jet head is scanned in the scanning direction,
the discharged radiation-curable ink jet composition contains a monofunctional monomer including a nitrogen-containing monofunctional monomer, an amount of the monofunctional monomer being 80 mass % of more relative to a total amount of the radiation-curable ink jet composition, and
an amount of the nitrogen-containing monofunctional monomer is from 5 to 20 mass % relative to the total amount of the radiation-curable ink jet composition.

18. An ink jet head used to discharge a radiation-curable ink jet composition, the ink jet head comprising:
a first nozzle group including a plurality of nozzles in a column direction; and a second nozzle group including a plurality of nozzles in the column direction, the first nozzle group and the second nozzle group being arranged at different positions from each other in the column direction and in a scanning direction intersecting the column direction, wherein
the radiation-curable ink jet composition to be discharged contains a monofunctional monomer including a nitrogen-containing monofunctional monomer, an amount of the monofunctional monomer being 80 mass % or more relative to a total amount of the radiation-curable ink jet composition, and
an amount of the nitrogen-containing monofunctional monomer is from 5 to 20 mass % relative to the total amount of the radiation-curable ink jet composition.

19. A set comprising a radiation-curable ink jet composition and an ink jet head, wherein
the ink jet head is used to discharge the radiation-curable ink jet composition,
the ink jet head includes a first nozzle group including a plurality of nozzles in a column direction and a second nozzle group including a plurality of nozzles in the column direction, and the first nozzle group and the second nozzle group are arranged at different positions from each other in the column direction and in a scanning direction intersecting the column direction,
the radiation-curable ink jet composition contains a monofunctional monomer including a nitrogen-containing monofunctional monomer, an amount of the monofunctional monomer being 80 mass % or more relative to a total amount of the radiation-curable ink jet composition, and
an amount of the nitrogen-containing monofunctional monomer is from 5 to 20 mass % relative to the total amount of the radiation-curable ink jet composition.

20. The ink jet method according to claim 1, wherein the radiation-curable ink jet composition includes isobornyl acrylate.

21. The ink jet method according to claim 1, wherein the a number of nozzle groups discharging the radiation-curable ink jet composition including the first nozzle group and the second nozzle group is 2 to 4.

22. The ink jet method according to claim 1, wherein an irradiance of the radiation directed toward the radiation-curable ink jet composition during the irradiating is 3 to 12 W/cm$^2$.

* * * * *